Patented July 24, 1928.

1,678,626

UNITED STATES PATENT OFFICE.

ALPHONS O. JAEGER, OF HAMBURG, NEW YORK, ASSIGNOR TO THE SELDEN COMPANY, OF PITTSBURGH, PENNSYLVANIA, A CORPORATION OF DELAWARE.

PROCESS OF REVIVING CATALYSTS.

No Drawing.   Application filed August 3, 1925. Serial No. 48,001.

This invention relates to the revivification or regeneration of catalysts or contact masses which have partly or completely lost their catalytic activity and efficiency; and it relates particularly to a method of restoring more or less completely the catalytic activity of contact masses which are employed in catalytic oxidation reactions in general and in the catalytic oxidation of organic compounds in particular.

It is well known that catalysts or contact masses employed in catalytic reactions over a period of time gradually lose more or less of their catalytic power and efficiency.

This may be illustrated, for example, in the known deterioration or depreciation of the catalytic activity which often occurs in contact masses employed in the catalytic oxidation of naphthalene to alpha-naphthoquinone, phthalic anhydride or maleic acid; of benzene, toluene or phenol to maleic acid; of benzene or phenol to benzoquinone; of toluene and its substitution products and derivatives to the corresponding aldehydes and acids; of anthracene to anthraquinone; of acenaphthene to acenaphthoquinone or naphthalic anhydride; of phenanthrene to phenanthraquinone; of orthocresol to salicylaldehyde or salicylic acid, of fluorene to fluorenone; of methyl alcohol to formaldehyde; of ethyl alcohol to acetic acid; and the like.

The deterioration or loss in the catalytic activity of contact masses may be due in part to the presence in the substance being subjected to catalytic action of certain impurities which are prejudicial to the life of the catalyst. In case of organic substances undergoing catalytic action, and particularly catalytic oxidation, it may be due also in part to the distribution of deposition of carbon or carbonaceous material upon the surface and interior of the contact mass, thereby partly or completely coating it, and thus diminishing its porosity and capillarity. Or it may be due in part to the contact mass itself undergoing chemical alterations such as, for example, the formation in catalytic oxidations of certain oxidation steps or stages which may be of such a nature that the actual catalyst is no longer regenerated by oxygen or oxygen containing gases and consequently a sufficient amount of active oxygen is no longer available for the desired catalysts. Such chemical alterations may occur, for example, in catalysts comprising the oxides, compounds or combinations of the elements of the fifth, sixth and seventh, and eighth groups of the periodic system; but such changes are not limited to these elements or their compounds or combinations. Further, so-called stabilizers or activators which may be present in the contact mass may suffer chemical changes because of reducing or other actions, for example, in catalytic reactions involving the presence of hydrogen or of organic compounds, and their stabilizing or activating influence be thereby partly or completely eliminated.

Attempts have been made heretofore to regenerate or revive the catalytic activity of deteriorated or depreciated catalysts, which have become so, for example, by use in the catalytic oxidation of organic compounds, by heating them to high temperatures either alone or in a current of oxygen or air. But such attempts have met with only moderate or partial success and the desired end has not been ordinarily attained.

This invention contemplates increasing or regenerating the catalytic activity of deteriorated catalysts or contact masses, and particularly catalysts or contact masses deteriorated by use in catalytic oxidation reactions, and especially those employed in the catalytic oxidation of organic compounds, by treating them with an inorganic peroxide such as, for example, hydrogen peroxide. Ozone, or ozone containing gases, may also be used and for the purpose of this invention ozone is regarded as a non-acidic peroxide, namely, a peroxide of oxygen. The inorganic peroxides employed in the present invention must be volatile without leaving a residue at temperatures below red heat (about 550° C.).

The regeneration of deteriorated catalysts, and especially catalysts which have become deteriorated by use in the catalytic oxidation of organic compounds, by means of the inorganic peroxides of the character mentioned is particularly effective in restoring or increasing the catalytic activity of the catalyst or contact mass to a degree of efficiency not ordinarily obtained, if at all, by heretofore known processes.

In carrying out the process, the deteriorated catalyst or contact mass is subjected to the action of hydrogen peroxide, or to ozone or an ozone containing gas such as, for example, ozonized air. Or, if desired, the catalyst or contact mass may be treated with both hydrogen peroxide and ozone at the same time or alternately. Pressures equal, less, or greater than atmospheric pressure may be used.

When hydrogen peroxide is used as the regenerating agent, solutions may be employed, and of any suitable strength. Thus, 3 percent to 30 percent aqueous solutions of hydrogen peroxide are effective. While hydrogen peroxide may be used either in the liquid form or in the vapor phase, it is preferably employed in aqueous solutions and at temperatures below the boiling point of the solution. Further, when employing hydrogen peroxide as the regenerating agent, it is preferable that the deteriorated catalyst subjected to its action be substantially free from carbon or carbonaceous material. The carbon or carbonaceous material, if present, is therefore preferably first removed in any suitable manner such as, for example, treating the catalyst in a current of oxygen or oxygen containing gases or, if preferred, by the process described in my co-pending application, Serial Number 48,002, filed August 3, 1925, and then subsequently treating the catalyst, which is free from carbon, with hydrogen peroxide.

When the regeneration of the catalyst is carried out by means of ozone, a current of ozone containing gases such as, for example, ozonized air, is passed over and through the catalyst. If the catalyst is free from carbon or carbonaceous material, the regeneration with ozone may be carried out at or-. dinary temperatures, otherwise, it is preferably passed over the catalyst at elevated temperatures (150–300° C.).

The regeneration of the catalyst is preferably brought about in the catalytic chamber without removal of the catalyst therefrom when ozone is employed as the regenerating agent; but it is preferably removed therefrom when solutions of hydrogen peroxide are used. The regeneration of the catalysts can be carried out, however, in either case without or with removal of the contact mass from the contact chamber and at any suitable temperature, for example, from about ordinary temperatures to about 300° C.

The following specific examples will further illustrate the invention but it will be understood that the invention is not limited thereto.

*Example 1.*—A catalyst originally comprising 200 liters of pumice the size of peas, 29 kg. by weight of iron vanadate, 3 kg. by weight of cobalt molybdate, and 25 kg. by weight of potassium sulfate, and which has become deteriorated by use in the catalytic oxidation of anthracene to anthraquinone, is heated first in a current of air or oxygen alone to about 300–450° C. until the carbon and carbonaceous matters are eliminated. The contact mass is then cooled and treated at ordinary temperature in a kettle or other suitable vessel with about 50 to 75 liters of a 3 percent aqueous hydrogen peroxide solution. The hydrogen peroxide is added in small portions at a time while the catalyst is being gently mixed by turning it over with a shovel or other suitable implement or means. After all of the hydrogen peroxide has been added, the water and excess hydrogen peroxide are removed by evaporation to dryness.

While hydrogen peroxide is an efficient agent for the regeneration of the catalytic activity of deteriorated catalyzers in general, it is particularly efficient in regenerating catalysts deteriorated in catalytic oxidation reactions, particularly in the catalytic oxidation of organic compounds. It is especially effective in regenerating or increasing the catalytic activity of catalysts or contact masses which have become deteriorated or spent by use in catalytic oxidations wherein the catalyst or contact mass comprises one or more substances, compounds or salts of the metals of the fifth, sixth, seventh and eighth groups of the periodic system, and which may or may not have present so-called stabilizers or activators such as, for example, certain compounds or salts of the elements of the first, second, third and fourth groups of the periodic system. Thus, salts or compounds of the alkali and alkaline earth metals are sometimes employed as so-called stabilizers or activators in that their presence in admixture with catalysts often stabilize, augment or retard the catalytic activity of the latter. Some of these so-called stabilizers or activators are neutral or acid in character, such as, for example, calcium chloride, potassium sulfate, potassium acid sulfate, etc. Some are more or less alkaline in character, such as for example, the borates, hydroxides, oxides, cyanides, carbonates, silicates, phosphates, etc., of the alkali metals. Catalysts or contact masses containing stabilizers of an alkaline character are particularly adapted for regeneration by treatment with hydrogen peroxide since their alkalinity in many cases is destroyed if treated with an acid oxidizing regenerating agent. Catalysts deteriorated by use in the catalytic oxidation of anthracene to anthraquinone, of phenanthrene to phenanthroquinone, and of acenaphthene to naphthalic acid are readily regenerated by treatment with hydrogen peroxide. Also, hydrogen peroxide is especially useful for the regeneration of the catalytic activity of catalysts and contact masses which comprise an iron compound either alone, or in admixture or in combination with other catalysts or substances.

*Example 2.*—A contact mass originally comprising 200 liters of metallic aluminum of the size of peas and 10 kg. of silver vanadate, and which has become deteriorated by use in the catalytic oxidation of benzene to maleic acid, or of methyl alcohol to formaldehyde, is treated in the contact chamber with a current of ozonized air first at about ordinary temperature and then gradually increasing the temperature to about 300° C. The treatment is continued for about 1 to 3 hours or until a regeneration or increase in catalytic activity is effected which approximately occurs when carbon dioxide can no longer be detected in the exit gases.

It is thus seen that the present invention effects the regeneration of the catalytic activity of contact masses, and particularly those used in catalytic oxidation reactions, especially catalytic oxidation of organic compounds, by treating them with inorganic peroxides, such as, for example, hydrogen peroxide or ozone; that the regeneration can be effected with hydrogen peroxide, particularly aqueous solutions of hydrogen peroxide at temperatures below, at or above the boiling point of the solution; and with ozone or ozonized air from ordinary temperatures to temperatures of about 300° C., and that it is preferable, particularly when hydrogen peroxide is used as the regenerating agent, to first treat the catalyst in any suitable manner to remove the carbon or carbonaceous matter and then subsequently treat it with the non-acidic inorganic peroxide either at ordinary or at elevated temperatures, or both.

In the claims, it will be understood that the term "substance" includes the metallic element, and oxide, hydroxide, salt or any compound of the metallic element; the term "compound" includes the oxide, hydroxide, salt or other compound of the metallic element but not the metallic element itself; the term "salt" includes a compound of the metallic element in which the element plays either a base-forming or an acid-forming part and includes simple, complex and double salts either alone, in admixture or in combination, but does not include the metallic element or an oxide or hydroxide of the metallic element as such.

I claim:

1. A process of regenerating the catalytic activity of deteriorated contact masses which contact masses are not injured by treatment with oxidizing agents, which comprises subjecting the contact masses to treatment with an inorganic peroxide belonging to the group consisting of hydrogen peroxide and ozone.

2. A process of regenerating the catalytic activity of deteriorated contact masses containing at least one of the metals of the 5th, 6th, 7th, or 8th groups of the periodic system and which contact masses are not injured by treatment with oxidizers, which comprises subjecting the said deteriorated contact masses to treatment with an inorganic peroxide of the group which consists of ozone and hydrogen peroxide.

3. A process of regenerating the catalytic activity of deteriorated contact masses containing stabilzers, whch contact masses have become deteriorated in the catalytic oxidation of organic substances, which comprises subjecting the said deteriorated contact masses to a treatment with an inorganic peroxide of the group which consists of hydrogen peroxide and ozone.

4. A process according to claim 2 in which at least one of the metals of the 5th, 6th, 7th, or 8th groups of the periodic system is present in the form of a salt.

5. A method according to claim 1 in which the treatment takes place at a temperature above room temperature.

6. A method of regenerating the catalytic activity of deteriorated contact masses which are not injured by treatment with oxidizers, which comprises subjecting the said deteriorated contact masses to the action of air at temperatures between 200 and 500° C., and subsequently to the action of an aqueous solution of hydrogen peroxide at a temperature below its boiling point.

Signed at St. Louis, Missouri, this 28th day of July, 1925.

ALPHONS O. JAEGER.